(12) United States Patent
Urakawa

(10) Patent No.: US 9,886,137 B2
(45) Date of Patent: Feb. 6, 2018

(54) INPUT DEVICE, CONTROL METHOD OF THE INPUT DEVICE AND NON-TRANSITORY COMPUTER-READABLE MEDIUM HAVING COMPUTER PROGRAM FOR CONTROLLING THE INPUT DEVICE

(71) Applicant: BROTHER KOGYO KABUSHIKI KAISHA, Nagoya-shi, Aichi-ken (JP)

(72) Inventor: Yukata Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 2 days.

(21) Appl. No.: 15/226,116

(22) Filed: Aug. 2, 2016

(65) Prior Publication Data

US 2017/0038909 A1 Feb. 9, 2017

(30) Foreign Application Priority Data

Aug. 4, 2015 (JP) .................. 2015-153936

(51) Int. Cl.
*G06F 3/041* (2006.01)
*G06F 3/0488* (2013.01)
*G06F 3/0486* (2013.01)
*H04N 1/00* (2006.01)

(52) U.S. Cl.
CPC .......... *G06F 3/0418* (2013.01); *G06F 3/0412* (2013.01); *G06F 3/0486* (2013.01); *G06F 3/04886* (2013.01); *H04N 1/00392* (2013.01); *G06F 2203/04108* (2013.01); *G06F 2203/04803* (2013.01)

(58) Field of Classification Search
CPC ...... G06F 3/044; G06F 3/0416; G06F 3/0488; G06F 3/04886
USPC .................................................. 345/173, 174
See application file for complete search history.

(56) References Cited

U.S. PATENT DOCUMENTS

2009/0174679 A1* 7/2009 Westerman ......... G06F 3/03547
345/173
2014/0292359 A1 10/2014 Akagi et al.
2015/0002441 A1* 1/2015 Brunet .................... G06F 3/044
345/174

FOREIGN PATENT DOCUMENTS

JP 2014-067316 A 4/2014
JP 2014-197287 A 10/2014

* cited by examiner

*Primary Examiner* — Koosha Sharifi-Tafreshi
(74) *Attorney, Agent, or Firm* — Scully, Scott, Murphy & Presser, PC

(57) ABSTRACT

An input device includes a first input interface, a second input interface disposed adjacent to the first input interface, and a controller configured to: validate an input to the first input interface when a first detection value corresponding thereto is greater than a first threshold value; validate an input to the second input interface when a second detection value corresponding thereto is greater than a second threshold value; and change the second threshold value so that detection sensitivity is lowered in response to a specific screen including an item located at an area adjacent to the second input interface being displayed on the first input interface and/or an input received at the first input interface being a specific input to an area adjacent to the second input interface.

20 Claims, 10 Drawing Sheets

INPUT DEVICE, CONTROL METHOD OF THE INPUT DEVICE AND NON-TRANSITORY COMPUTER-READABLE MEDIUM HAVING COMPUTER PROGRAM FOR CONTROLLING THE INPUT DEVICE

CROSS-REFERENCE TO RELATED APPLICATION

This application claims priority from Japanese Patent Application No. 2015-153936 filed on Aug. 4, 2015, the entire subject-matter of which is incorporated herein by reference.

TECHNICAL FIELD

The disclosure relates to an input device, a control method of the input device and a program. More specifically, the disclosure relates to a technology of an input device having a plurality of input units and configured to receive an input to each input unit resulting from touch or approach of an object.

BACKGROUND

There has been proposed an input device having a plurality of input units and configured to receive an input to each input unit resulting from touch or approach of an object, such as a touch operation of an operator, has been put to practical use. In the input device, when the plurality of input units is disposed adjacent to each other, the object may touch or approach over the plurality of input units, so that an unintentional input of the operator may be received.

There has been disclosed a technology of coping with the unintentional input of the operator, for example. The related-art technology discloses a configuration of a digital camera having a touchscreen panel provided to be freely moveable relative to a main body, where when an angle formed by the touchscreen panel and the main body is a predetermined value or greater, regarding a touch operation on the touchscreen panel, detection sensitivity of a touch operation in a direction of coming close to a grip part configured to grip the main body is made different from detection sensitivity of a touch operation in a direction of getting away from the grip part.

SUMMARY

One illustrative aspect of the disclosure may provide an input device comprising: a first input interface configured to display a screen for receiving an input and to output a first output value in accordance with an input resulting from touch or approach of an object to the first input interface; a second input interface disposed adjacent to the first input interface, the second input interface being configured to output a second output value in accordance with an input resulting from touch or approach of the object to the second input interface; and a controller configured to: in response to detecting an input to the first input interface, determine whether a first detection value based on the first output value is greater than a first threshold value, and validate the input to the first input interface, when it is determined that the first detection value is greater than the first threshold value; in response to detecting an input to the second input interface, determine whether a second detection value based on the second output value is greater than a second threshold value, and validate the input to the second input interface, when it is determined that the second detection value is greater than the second threshold value; and change the second threshold value so that detection sensitivity is lowered in response to at least one of: a specific screen being displayed as a screen to be displayed on the first input interface, the specific screen comprising an item located at an area adjacent to the second input interface; and an input received at the first input interface being a specific input to an area adjacent to the second input interface.

A control method, a computer program and a computer-readable storage medium configured to store therein the computer program for implementing the functions of the input device are also novel and useful.

According to the disclosure, it is possible to implement the technology capable of suppressing the lowering of the operability and the operator's unintentional input in the input device including two adjacent input units having different detection methods.

DETAILED DESCRIPTION

The above-described related-art technology has following problems. That is, when a position of the input unit is changed with respect to the operator, the detection sensitivity of the touch operation is changed. However, there is a high possibility that an unintentional input of the operator may occur, in addition to a positional relation between the input unit and the operator. Specifically, in a configuration where two input units having different detection methods are disposed adjacent to each other, while operating one input unit, the operator tends to consciously operate the one input unit, so that the operator may unintentionally operate the other input unit. In this case, it is possible to suppress an erroneous operation by lowering the detection sensitivity of the other input unit. However, when the detection sensitivity is lowered with no exception, the operability of the other input unit is considerably lowered.

Therefore, illustrative aspects of the disclosure provides a technology capable of suppressing lowering of operability and an operator's unintentional input in an input device including two adjacent input units having different detection methods.

Hereinafter, a specific illustrative embodiment of the input device of the disclosure will be described in detail with reference to the accompanying drawings. In this illustrative embodiment, the disclosure is applied to a complex machine (MFP: Multi Function Peripheral) having an input function.

Figure 1:
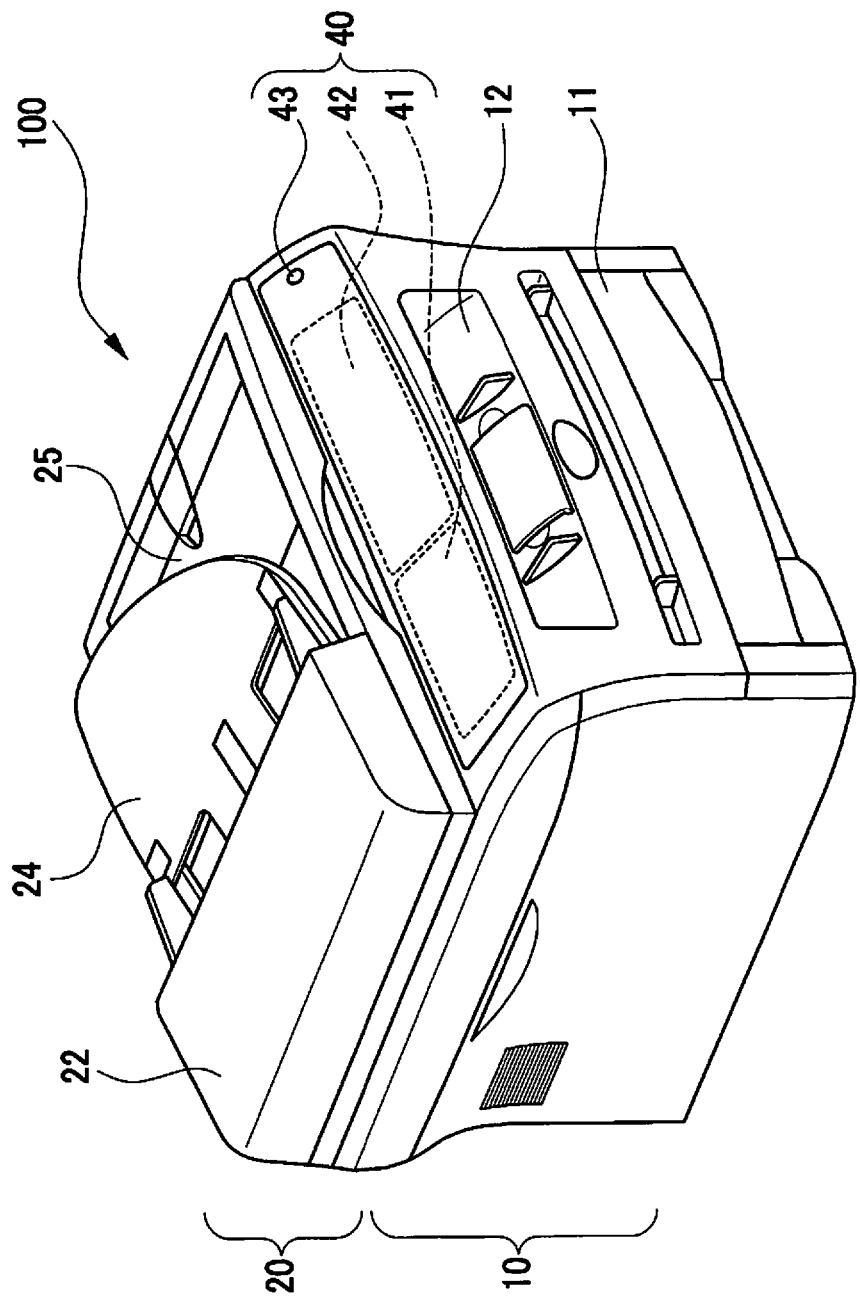
FIG. 1 is a schematic view depicting an outward appearance of an MFP according to an illustrative embodiment.

As shown in FIG. 1, an MFP 100 of the illustrative embodiment includes an image forming unit 10, an image reading unit 20 and an operation panel 40. The image forming unit 10 is configured to print an image on a sheet. An image forming method of the image forming unit 10 may be an electrophotographic method or an inkjet method. Also, the MFP 100 may be an apparatus capable of forming a color image or an apparatus dedicated for a monochrome image. Also, the MFP 100 may be an apparatus capable of performing duplex printing or an apparatus dedicated for single printing.

The MFP 100 has a sheet feeding tray 11 configured to accommodate therein sheets for printing and a sheet discharging tray 12 configured to accommodate thereon printed sheets. The MFP 100 is configured to perform printing on a sheet accommodated in the sheet feeding tray 11 by using the image forming unit 10 and to discharge a printed sheet to the sheet discharging tray 12.

The image reading unit 20 is configured to read an image of a document. A reading method may be a CCD method or a CIS method. Also, the image reading unit may be configured to perform a color reading or only a monochrome reading.

The image reading unit 20 has an ADF (Automatic Document Feeder) 22 having a function of conveying a document, which is a reading target. As shown in FIG. 1, the ADF 22 is provided at an upper part of a housing of the MFP 100 and has a document tray 24 and a document discharging tray 25. The image reading unit 20 is configured to convey one of documents put on the document tray 24 to the ADF 22, to read an image of the document during the conveying and to discharge the read document to the document discharging tray 25.

The ADF 22 of the image reading unit 20 is configured to be rotatable about one left inner side of FIG. 1 and is provided to be freely openable and closable with respect to the MFP 100. A reading glass is provided below the ADF 22. The MFP 100 may also be configured to read a document put on the reading glass. For example, when a reading instruction is received at a state where there is no sheet on the document tray 24 of the ADF 22, the MFP 100 reads a document on the reading glass.

As shown in FIG. 1, the operation panel 40 is positioned on a front surface side of the apparatus, and has a touchscreen panel 41, a touch key area 42 adjacent to the touchscreen panel 41 and a power supply button 43. The touchscreen panel 41 and the touch key area 42 are respectively configured to receive an input operation resulting from touch or approach of an object such as a user's finger. The touchscreen panel 41 is an example of the first input unit, and the touch key area 42 is an example of the second input unit. The touchscreen panel 41 and the touch key area 42 will be described in detail later.

Figure 2:
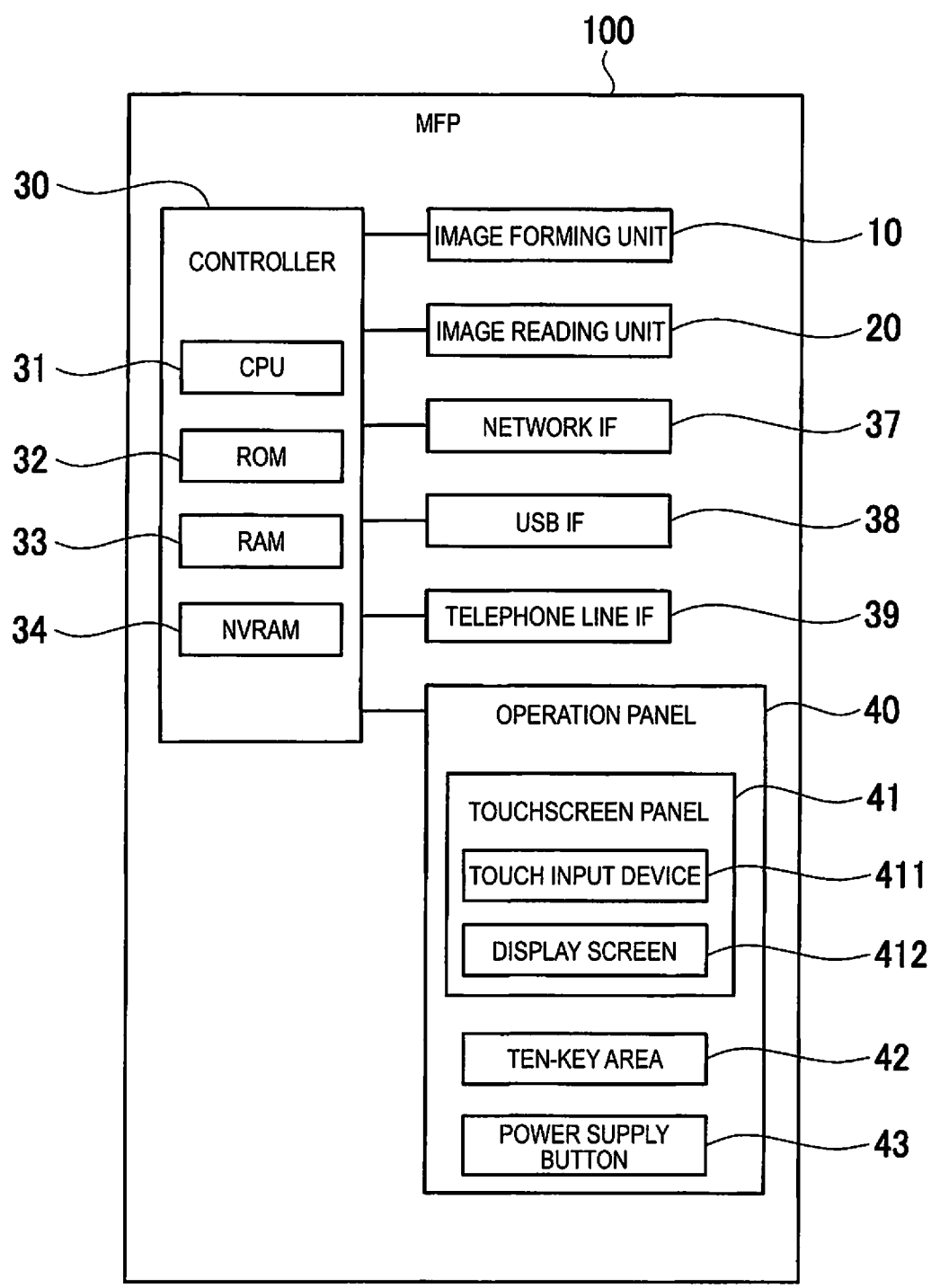
FIG. 2 is a block diagram depicting an electrical configuration of the MFP.

Subsequently, an electrical configuration of the MFP 100 of the illustrative embodiment is described. As shown in FIG. 2, the MFP 100 has a controller 30 including a CPU 31, a ROM 32, a RAM 33 and an NVRAM (non-volatile RAM) 34. Also, the MFP 100 has the image forming unit 10, the image reading unit 20, a network IF (interface) 37, a USB IF 38, a telephone line IF 39 and the operation panel 40, which are electrically connected to the controller 30.

In the ROM 32, a variety of control programs for controlling the MFP 100, a variety of settings, initial values and the like are stored. The RAM 33 is used as a work area from which the variety of control programs are to be read out or a storage area in which data is temporarily stored. The NVRAM 34 is used as an area in which data such as image data, the diverse settings and the like are stored.

The CPU 31 is configured to store processing results in the RAM 33 or the NVRAM 34 in accordance with the control programs read out from the ROM 32 and to control the respective constitutional elements of the MFP 100. The CPU 31 is an example of a controller. The controller 30 may be the controller. In the meantime, the controller 30 of FIG. 2 is a generic term of the hardware that is to be used to control the MFP 100, such as the CPU 31, and does not indicate only the single hardware actually provided for the MFP 100.

The network IF 37 is hardware configured to perform communication with an external apparatus connected to a network. A communication method may be wired or wireless. The USB IF 38 is hardware to which a flash memory such as a USB memory is to be connected and which is configured to perform communication with the connected flash memory. The telephone line IF 39 is hardware configured to perform communication with an external apparatus connected to a telephone network, through a telephone line.

Figure 3:
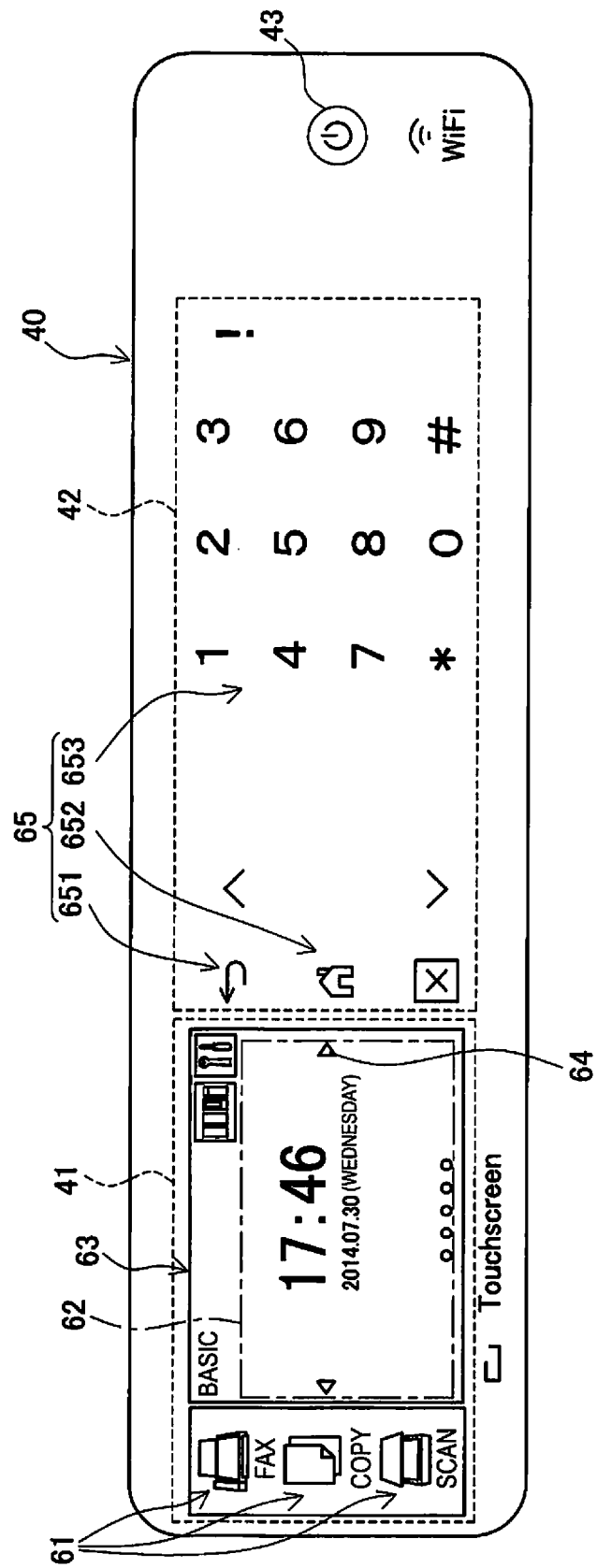
FIG. 3 illustrates a display example of an operation panel.

Subsequently, the operation panel 40 of the MFP 100 of the illustrative embodiment is described. A display example of the operation panel 40 at a standby state of the MFP 100 is shown in FIG. 3. In the below, disposal of the respective units of the operation panel 40 is described using the upper, lower, left and right directions of FIG. 3.

As shown in FIG. 3, in the operation panel 40 of the illustrative embodiment, the touchscreen panel 41 and the touch key area 42 are disposed adjacent to each other in the left-right direction. Specifically, the touch key area 42 is adjacent to the right of the touchscreen panel 41. In this illustrative embodiment, the left-right direction of FIG. 3 is an example of the first direction, and the upper-lower direction of FIG. 3 is an example of the second direction. In the meantime, the disposal of the touchscreen panel 41 and the touch key area 42 is not limited to the illustrative embodiment. That is, the touchscreen panel 41 and the touch key area 42 may be disposed in left-right reversal or may be disposed adjacent in the upper-lower direction inasmuch as they are disposed adjacent to each other.

The touchscreen panel 41 has a touch input device 411 and a display screen 412 (refer to FIG. 2) of a resistance film type with being overlapped, for example. The touch input device 411 of the touchscreen panel 41 is configured to output an output signal corresponding to an input operation resulting from the touch of the user's finger, for example. The MFP 100 is configured to obtain a detection value by multiplying a predetermined coefficient, for example, on the basis of the output signal of the touch input device 411. Further, when the obtained detection value is greater than a predetermined threshold value, the MFP 100 validates the received input operation and obtains a position of the received input operation in the touch input device 411. The output signal of the touch input device 411 is an example of the first output value, the detection value based on the output signal of the touch input device 411 is an example of the first detection value, and the threshold value relating to the detection value of the touch input device 411 is an example of the first threshold value.

Also, the display screen 412 of the touchscreen panel 41 is configured to display a guidance for indicating positions and meanings of respective input items in the touch input device 411. The MFP 100 is configured to receive a touch operation and a drag operation by the user's finger or the like, as an input operation on the touchscreen panel 41. The MFP 100 is configured to display a button position for receiving the touch operation and a drag area for receiving the drag operation on the display screen 412. The respective locations for receiving the input operation, such as the button position, the drag area and the like displayed on the display screen 412 of the touchscreen panel 41 are input items. The MFP 100 is configured to receive at least one of the touch operation and the drag operation for each input item. The MFP 100 is configured to execute processing corresponding to the input operation, based on a position of the received input operation and an disposal of the displayed input items.

FIG. 3 depicts an example where an input window 63, which includes a plurality of input buttons 61 and a drag area 62 for receiving a drag operation in the left-right direction, is displayed on the display screen 412 of the touchscreen panel 41. The input button 61 is a button for receiving a shift instruction to a setting screen in which detailed settings of a corresponding function can be made. When a touch operation by the user's finger or the like at a position of each input button 61 is received, the MFP 100 changes display contents on the touchscreen panel 41, and displays a setting screen for executing a corresponding function, for example.

Also, the input window 63 has screens of a plurality of pages and is configured to display one page thereof. When a drag operation on the drag area 62 in the input window 63 is received, the MFP 100 changes the display of the input window 63 to a next page or a previous page, in accordance with a drag direction. On the other hand, when an input item is not displayed at a position of the received input operation, the MFP 100 invalidates the received input operation. However, when the received input operation is a drag operation, it may be received, irrespective of whether the input operation has been made in the drag area 62.

The touch key area 42 has a plurality of touch keys 65 of an electrostatic capacitance type provided at fixed positions, respectively, for example. Each touch key 65 has a touch sensor configured to detect an electrostatic capacitance, and is configured to output an output signal corresponding to the touch or approach of the user's finger or the like. The MFP 100 is configured to obtain an amount of change in electrostatic capacitance, which is detected by the touch sensor, as a detection value, based on the output signal of each touch key 65. The MFP 100 is configured to receive an output signal of each touch key 65 at periodic timing such as 50 ms, for example, and to calculate a difference between the output signal and a previously received output signal, thereby obtaining a detection value.

When the amount of change in electrostatic capacitance is greater than a predetermined threshold value, the MFP 100 determines that a valid input to the touch key 65 has been received. That is, the MFP 100 is configured to determine whether the detection value obtained on the basis of the output signal of each touch key 65 is greater than a threshold value provided for the touch key area 42. When there is a touch key 65 for which the detection value has been determined greater than the threshold value, the MFP 100 validates the input operation to the touch key 65 and executes an operation allotted to the touch key 65.

Therefore, the MFP 100 can change detection sensitivity of the touch key 65 by changing the threshold value provided for the touch key area 42. Specifically, in this illustrative embodiment, as described above, the detection value is obtained on the basis of the difference with the previously received output signal. Therefore, the greater the threshold value of the touch key area 42 is, the lower the detection sensitivity of each touch key 65 of the touch key area 42 is, and the smaller the threshold value of the touch key area 42 is, the higher the detection sensitivity of each touch key 65 of the touch key area 42 is. In the below, the threshold value of the touch key area 42 is referred to as the sensitivity threshold value. The output signal of each touch key 65 is an example of the second output value, the detection value based on the output signal of each touch key 65 is an example of the second detection value, and the sensitivity threshold value is an example of the second threshold value.

In the meantime, an LED configured to turn on an icon of each touch key 65 is disposed below the touch sensor of each touch key 65. In this illustrative embodiment, the MFP 100 is configured to turn on the LED of the touch key 65, which can receive an input, of the respective touch keys 65 of the touch key area 42. That is, the MFP 100 is configured to receive an input operation to the touch key 65 of which the LED of the icon is turned on and not to receive an input operation to the touch key 65 of which the LED of the icon is not turned on. In FIG. 3, regarding the touch key area 42, an example where the plurality of inputtable touch keys 65 including a back key 651, a home key 652 and a ten-key 653 is provided is shown.

In this illustrative embodiment, when a screen displayed on the display screen 412 of the touchscreen panel 41 is a specific display screen, the MFP 100 increases the sensitivity threshold value to lower the detection sensitivity of the touch key area 42. The specific display screen is a screen including an item that can be input to an area adjacent to the touch key area 42, as an input item for receiving an input operation to the touchscreen panel 41. Specifically, the specific display screen is a screen including an input item at a right end portion of the touchscreen panel 41 or an input item for receiving an input operation facing toward the right end portion of the touchscreen panel 41. That is, an input operation that is to be performed in correspondence to the specific display screen may span the touch key area 42 adjacent to the right end portion of the touchscreen panel 41.

For example, like the screen example shown in FIG. 3, a display screen including the drag area 62 for receiving a drag operation in the left-right direction is an example of the specific display screen. When the display screen including the drag area 62 is displayed on the touchscreen panel 41, a user may swiftly perform a drag operation rightwards, for example. In this case, a possibility that the user's finger or the like will enter or come close to the touch key area 42 increases. Therefore, when displaying a display screen including the drag area 62 for receiving a drag operation in the left-right direction on the touchscreen panel 41, the MFP 100 changes the sensitivity threshold value so that the detection sensitivity of the touch key area 42 is lowered.

Also, in the illustrative embodiment, when an input operation received by the touchscreen panel 41 is a specific input, the MFP 100 increases the sensitivity threshold value of the touch key area 42 to lower the detection sensitivity. The specific input is an input operation in which an input operation to the touchscreen panel 41 may become an input to an area adjacent to the touch key area 42. Specifically, the specific input is an input to the right end portion of the touchscreen panel 41 or an input involving movement toward the right end portion of the touchscreen panel 41. That is, when the specific input is received, there is a possibility that the user's finger or the like will touch the touch key area 42 from the right end portion of the touchscreen panel 41 after the specific input.

For example, in the example of FIG. 3, a touch to a triangle 64 displayed at the right end portion in the drag area 62 is a specific input. The triangle 64 is a button for changing a display page of the drag area 62. When an input operation to a right part of the touchscreen panel 41 is performed, a possibility that the user's finger or the like will thereafter enter or approach the touch key area 42 increases. Therefore, when an input operation to the touchscreen panel 41 is a touch to an area adjacent to the touch key area 42, the MFP 100 changes the sensitivity threshold value so that the detection sensitivity of the touch key area 42 is lowered.

Subsequently, sequences of a display operation and an input receiving operation on the operation panel 40, which are to be implemented by the MFP 100, are described with reference to flowcharts. In the below, the MFP 100 configured to change the sensitivity threshold value in accordance with the specific display screen is first described, as a first aspect. Then, the MFP 100 configured to change the sensitivity threshold value in accordance with the specific input is described as a second aspect.

Figure 4:
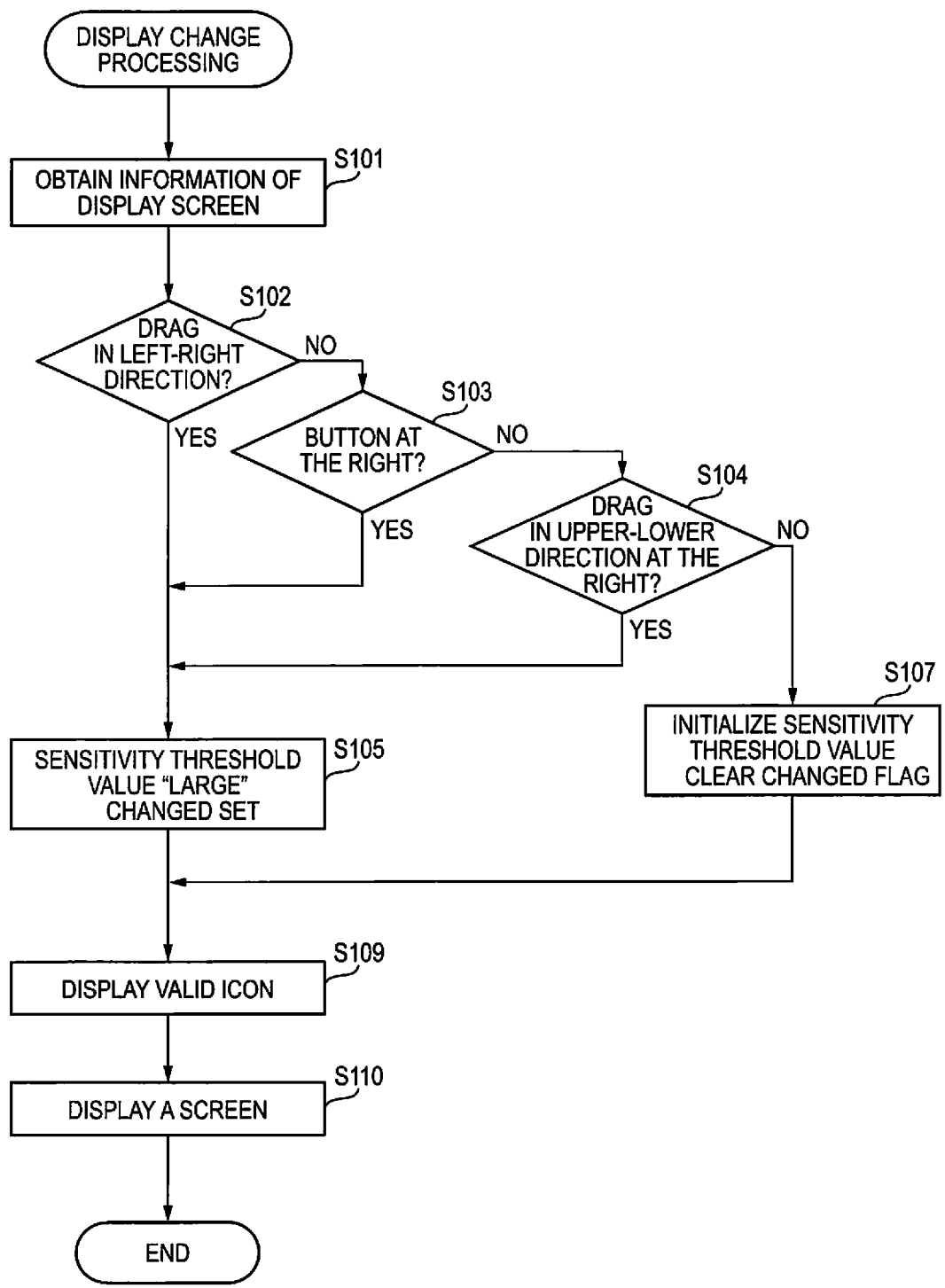
FIG. 4 is a flowchart depicting a sequence of display change processing.

A sequence of display change processing that is to be executed in the MFP 100 of the first aspect is described with reference to a flowchart of FIG. 4. The display change processing is executed by the CPU 31 when an event of switching a screen displayed on the touchscreen panel 41 occurs. In the meantime, the switching of the display screen of the touchscreen panel 41 is performed when a touch on the diverse input buttons 61, the home key 652 or the like is received.

In the display change processing, the CPU 31 first obtains screen information that is to be displayed from now (S101). The screen information includes types of the input items and disposal of the respective input items in the touchscreen panel 41. Then, the CPU 31 determines whether a screen to be displayed from now includes a drag area for receiving a drag operation in the left-right direction (S102). For example, when a screen to be displayed from now is a screen including the drag area 62 for receiving a drag operation in the left-right direction, like the example of FIG. 3, the CPU 31 determines YES in S102.

When it is determined that there is a drag area in the left-right direction (S102: YES), the CPU 31 changes the sensitivity threshold value to a value greater than an initial value and sets a changed flag (S105). The processing of S105 is an example of the change processing. The CPU 31 changes the sensitivity threshold value to a value of 1.5 to 2 times of the initial value, for example. The change of the sensitivity threshold value corresponds to change in level of the detection sensitivity of each touch key 65 of the touch key area 42, as described above. Since the CPU 31 changes the sensitivity threshold value to a value greater than the initial value, the CPU 31 lowers the detection sensitivity of each touch key 65 below an initial state. The changed flag is a flag indicating that the sensitivity threshold value has been changed from the initial value, and is stored in the RAM 33 or the NVRAM 34.

Since the drag operation is an operation of moving a finger or the like, which is performed by the user, there is a high possibility that the user's finger or the like will move beyond an input range. For this reason, in the drag operation in the left-right direction, there is a possibility that the user's finger or the like will approach the adjacent touch key area 42. In particular, when the user performs a drag operation facing toward the adjacent touch key area 42, there is a high possibility that the user's finger or the like will unintentionally come close to the touch key area 42 due to the inertia.

When displaying a screen which includes an input item for receiving the drag operation in the left-right direction, the MFP 100 increases the sensitivity threshold value of the touch key area 42 to lower the detection sensitivity of the touch key area 42. Thereby, even when the user's finger or the like approaches the touch key area 42, a possibility that the corresponding operation will be falsely detected as an input operation to the touch key 65 is low. In the meantime, even when the screen information includes information about a direction of the drag operation and the input item for receiving the drag operation in the left-right direction is included, if the input item is an input item for receiving only a drag operation in a direction of getting away from the adjacent touch key area 42, i.e., in the left direction, in the example of FIG. 3, the CPU may determine NO in S102.

Figure 5:
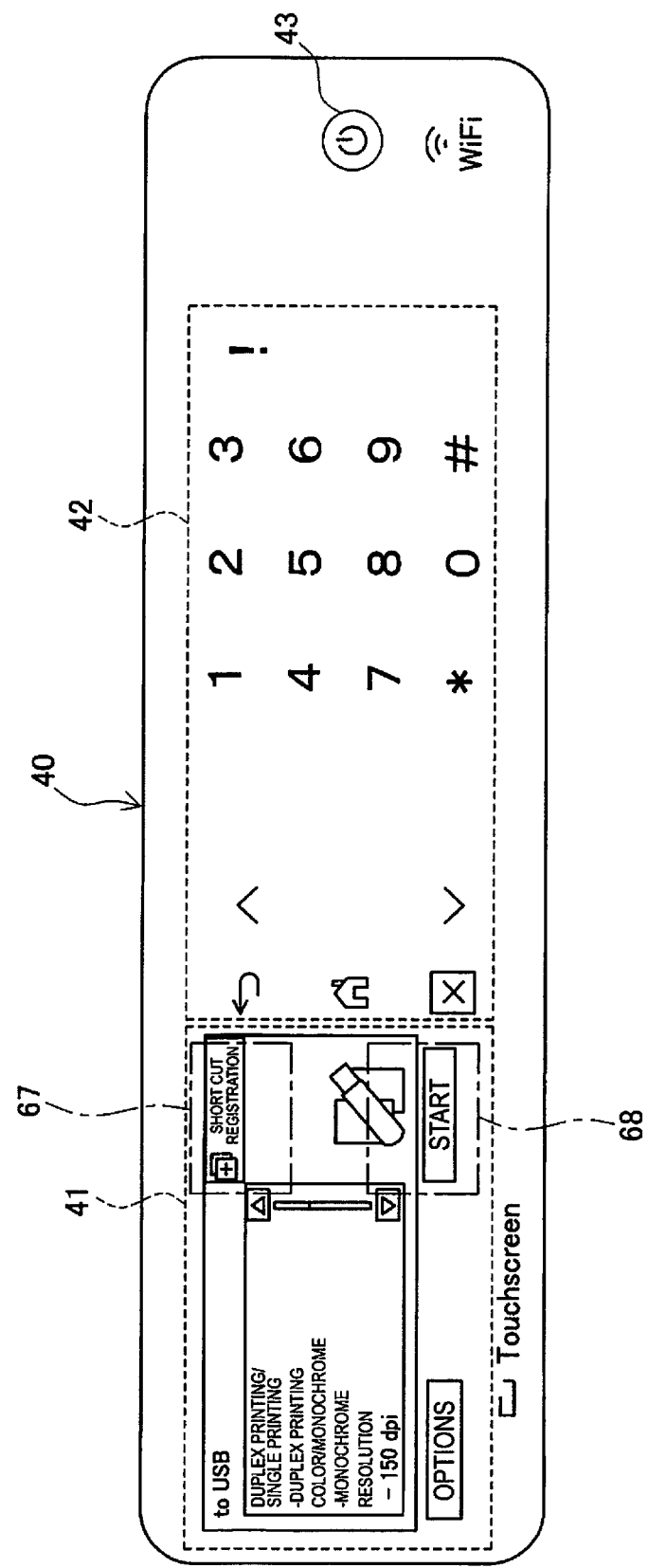
FIG. 5 illustrates a display example of the operation panel.

When it is determined that there is no drag area for receiving a drag operation in the left-right direction (S102: NO), the CPU 31 determines whether an input item for receiving a touch operation, such as an input button and the like, is provided at the right end portion of the touchscreen panel 41 (S103). For example, as shown in FIG. 5, there is a display screen in which input buttons 67, 68 are provided within a predetermined range from the right end of the touchscreen panel 41. When a touch operation to the input buttons 67, 68 is performed, a possibility that the user's finger or the like will approach the adjacent touch key area 42 is high.

Therefore, when it is determined that the input item is provided at the right end portion of the touchscreen panel 41 (S103: YES), the CPU 31 changes the sensitivity threshold value to a value greater than the initial value and sets a changed flag (S105). In the meantime, the CPU 31 determines YES in S103 when an input item for receiving an input is included at the right end portion of the touchscreen panel 41, without being limited to the input buttons 67, 68.

On the other hand, when it is determined that the input item is not provided at the right end portion of the touchscreen panel 41 (S103: NO), the CPU 31 determines whether an input item for receiving a drag operation in the upper-lower direction is included in n area within a predetermined range from the right end of the touchscreen panel 41 (S104). Even though an input item for receiving a drag operation in the upper-lower direction is provided, it cannot be said that a drag operation for the input item is correctly performed in the upper-lower direction. Therefore, there is a possibility that the user's finger or the like will approach the adjacent touch key area 42.

Therefore, when it is determined that there is an input item for receiving a drag operation in the upper-lower direction is included in the area within the predetermined range from the right end of the touchscreen panel 41 (S104: YES), the CPU 31 increases the sensitivity threshold value and sets a changed flag (S105). In the meantime, the CPU 31 determines YES in S104 when there is an input item for receiving a drag operation in a direction intersecting with the left-right direction, such as an inclined direction, without being limited to the upper-lower direction. Also, the predetermined range that is to be used in the determination of S104 may be the same as or different from the range of the right end portion, which is to be used in the determination of S103.

When it is determined that there is no drag area for receiving a drag operation in the upper-lower direction in the area within the predetermined range from the right end of the touchscreen panel 41 (S104: NO), the CPU 31 initializes the sensitivity threshold value and clears the changed flag (S107). When displaying a display screen in which there is no item for receiving a drag operation in the left-right direction and the input button or an input item of a drag in the upper-lower direction is not included at the right end portion of the touchscreen panel 41, the MFP 100 initializes the sensitivity threshold value.

Figure 6:
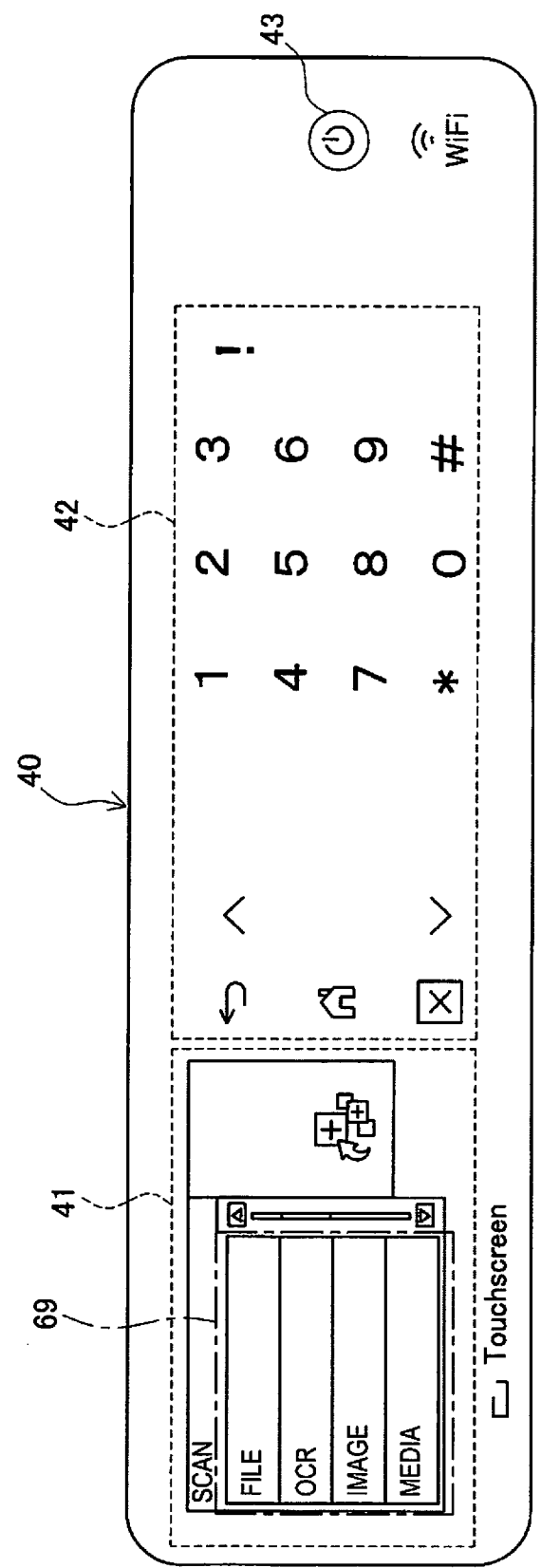
FIG. 6 illustrates a display example of the operation panel.

For example, when a display screen of an example shown in FIG. 6 is displayed, a possibility that the user's finger or the like will approach the touch key area 42 by an input to the touchscreen panel 41 is low. For this reason, the CPU sets the sensitivity threshold value to the initial value and does not lower the detection sensitivity of the touch key area 42. That is, the operability of the touch key area 42 is not lowered. In the meantime, an input item 69 of a drag in the upper-lower direction in FIG. 6 is positioned outside the predetermined range from the touch key area 42.

In the meantime, the MFP 100 stores the initial value of the sensitivity threshold value in the NVRAM 34 or the ROM 32. The CPU 31 reads out the stored initial value and sets the same as the sensitivity threshold value, in S107. Also, the MFP 100 stores the large sensitivity threshold value, which is to be used in S105, in the NVRAM 34 or the ROM 32. The CPU 31 reads out the stored value and sets the same as the sensitivity threshold value, in S105. Alternatively, the MFP 100 may use the different sensitivity threshold values, respectively, when a result of the determination in any of S102, S103 and S104 is YES.

In addition, after the processing of S105 or S107, the CPU 31 turns on an LED of an icon of a valid touch key 65, for which an input operation can be performed on the display screen, of the respective touch keys 65 of the touch key area 42 (S109). The MFP 100 stores a database, in which a type of the display screen and a type of a valid touch key 65 are associated with each other, in the ROM 32, and determines the valid touch key 65 with reference to the database. Also, the CPU 31 displays a new display screen on the touchscreen panel 41 (S110), and ends the display change processing.

Subsequently, key input processing, which is processing that is to be executed when a touch operation to the touch key 65 of the touch key area 42 is received, is described with reference to a flowchart of FIG. 7. The key input processing is executed by the CPU 31 when an output signal is received from the touch key 65 of which the LED of the icon is turned on. The key input processing is an example of the second input detection processing.

In the key input processing, the CPU 31 first obtains a detection value on the basis of the output signal output from the touch key 65 (S201). The detection value is calculated from a magnitude of the output signal on the basis of a predetermined calculation equation, for example. In S201, the CPU 31 further specifies the touch key 65 having output the output signal.

Also, the CPU 31 determines whether the sensitivity threshold value has been changed (S202). That is, the CPU 31 refers to the changed flag and determines that the sensitivity threshold value has been changed when the flag is set. The changed flag is set in S105 of the display change processing and is cleared in S107, for example.

When it is determined that the sensitivity threshold value has not been changed (S202: NO), the CPU 31 clears a count (S203). The count is to count the number of inputs that has been determined invalid by lowering the detection sensitivity through the change of the sensitivity threshold value. The count is stored in the RAM 33 or the NVRAM 34.

Then, the CPU 31 determines whether the detection value is greater than the sensitivity threshold value (S204). The sensitivity threshold value is the initial value because it has not been changed. When it is determined that the detection value is greater than the sensitivity threshold value (S204: YES), the CPU 31 executes an operation corresponding to the input touch key 65 (S205), and ends the key input processing. On the other hand, when it is determined that the detection value is not greater than the sensitivity threshold value (S204: NO), the CPU 31 ends the key input processing without executing an operation.

On the other hand, when it is determined that the sensitivity threshold value has been changed (S202: YES), the CPU 31 executes determination processing of determining whether or not to reflect the changed sensitivity threshold value on the basis of the position of the touch key 65 for which the input has been received (S207).

Figure 8:
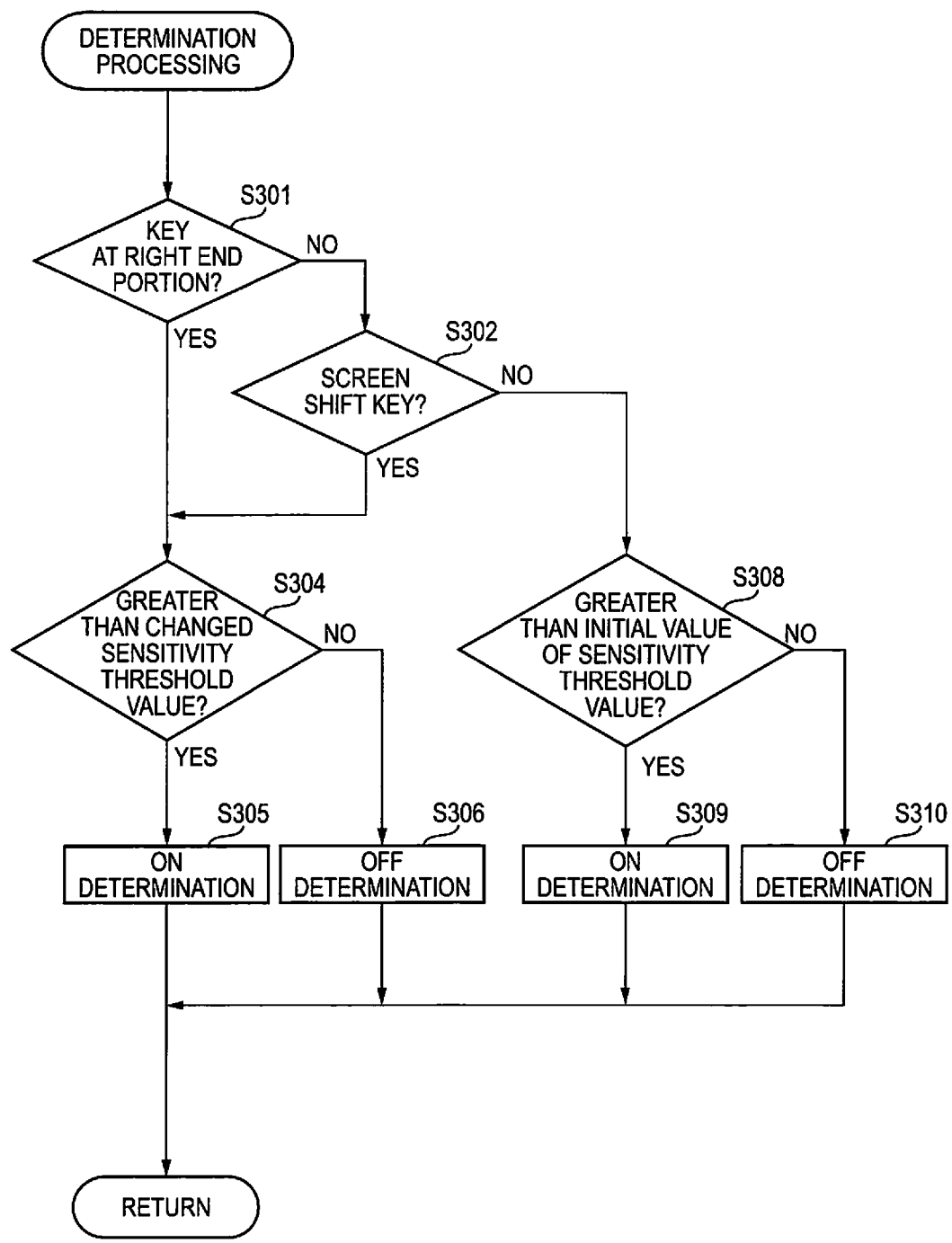
FIG. 8 is a flowchart depicting a sequence of determination processing.

Subsequently, a sequence of the determination processing is described with reference to a flowchart of FIG. 8. In the determination processing, the CPU 31 first determines whether the touch key 65 for which the input has been received is disposed at a left end portion of the touch key area 42 (S301). When it is determined that the corresponding key is not a key disposed at the left end portion of the touch key area 42 (S301: NO), the CPU 31 determines whether the touch key 65 is a key for receiving an input of an instruction involving shift of the display screen of the touchscreen panel 41 (S302). As the key involving shift of the display screen, the home key 652 for returning to a home screen, and the back key 651 for returning to one preceding screen may be exemplified. Incidentally, although FIG. 3 shows an example in which the back key 651 and the home key 652 are disposed at the left end portion of the touch key area 42, the back key 651 and the home key 652 may be disposed more central side in the touch key area and other touch key 65 may be disposed at the left end portion of the touch key area 42.

When it is determined that the corresponding key is disposed at the left end portion of the touch key area 42 (S301: YES) or when it is determined that the corresponding key is a key for receiving an input of an instruction involving shift of the display screen (S302: YES), the CPU 31 determines whether the detection value is greater than the changed sensitivity threshold value (S304). When it is determined that the detection value is greater than the changed sensitivity threshold value (S304: YES), the CPU 31 determines ON (S305), and ends the determination processing. On the other hand, when it is determined that the detection value is not greater than the changed sensitivity threshold value (S304: NO), the CPU 31 determines OFF (S306), and ends the determination processing.

On the other hand, when it is determined that the corresponding key is not a key for receiving an input of an instruction involving shift of the display screen (S302: NO), the CPU 31 determines whether the detection value is greater than the initial value of the sensitivity threshold value (S308). When it is determined that the detection value is greater than the initial value of the sensitivity threshold value (S308: YES), the CPU 31 determines ON (S309), and ends the determination processing. On the other hand, when it is determined that the detection value is not greater than the initial value of the sensitivity threshold value (S308: NO), the CPU 31 determines OFF (S310), and ends the determination processing For example, in the example of the operation panel 40 shown in FIG. 3, the five keys, which are disposed in two columns at the left, of the plurality of touch keys 65 of the touch key area 42 are closer to the touchscreen panel 41 than the other keys. For this reason, there is a possibility that the received input operation is not an operation intended by the user and is a false detection associated with an input operation to the touchscreen panel 41. On the other hand, a possibility that an input operation to the ten key 653 and the like distant from the touchscreen panel 41 is a false detection associated with an input operation to the touchscreen panel 41 is low.

For this reason, the MFP 100 is configured to lower the detection sensitivity of the touch key 65 by reflecting the change of the sensitivity threshold value for the keys disposed close to the touchscreen panel 41 and not to lower the detection sensitivity of the touch key 65 by using the sensitivity threshold value of the initial value for the keys disposed distant from the touchscreen panel 41. Thereby, while lowering the sensitivity so as to suppress the false input for some keys, it is possible to suppress the lowering of the operability, as compared to a configuration where the sensitivity is lowered in the entire touch key area 42 with no exception.

Also, in the example of the operation panel 40 shown in FIG. 3, for example, when an input to the home key 652 or the back key 651 of the plurality of touch keys 65 of the touch key area 42 is received, the MFP 100 shifts the display screen of the touchscreen panel 41. In processing where the shift of a screen is not involved, even when processing is executed by a false detection associated with the input operation to the touchscreen panel 41, the user can easily correct the processing and the user's disadvantage is negligible. On the other hand, when the shift of a screen is involved, there is a high possibility that the setting contents up to that time will be canceled and the user's disadvantage is high.

For this reason, for a key for receiving an input of an instruction involving shift of the display screen of the touchscreen panel 41, the MFP 100 is configured to lower the detection sensitivity of the touch key 65 by reflecting the change of the sensitivity threshold value. For a key for receiving an input of an instruction not involving shift of the display screen, the MFP 100 is configured not to lower the detection sensitivity of the touch key 65 by using the sensitivity threshold value of the initial value. Thereby, while lowering the sensitivity so as to suppress the false input for some keys, it is possible to suppress the lowering of the operability, as compared to a configuration where the sensitivity is lowered in the entire touch key area 42 with no exception.

Figure 7:
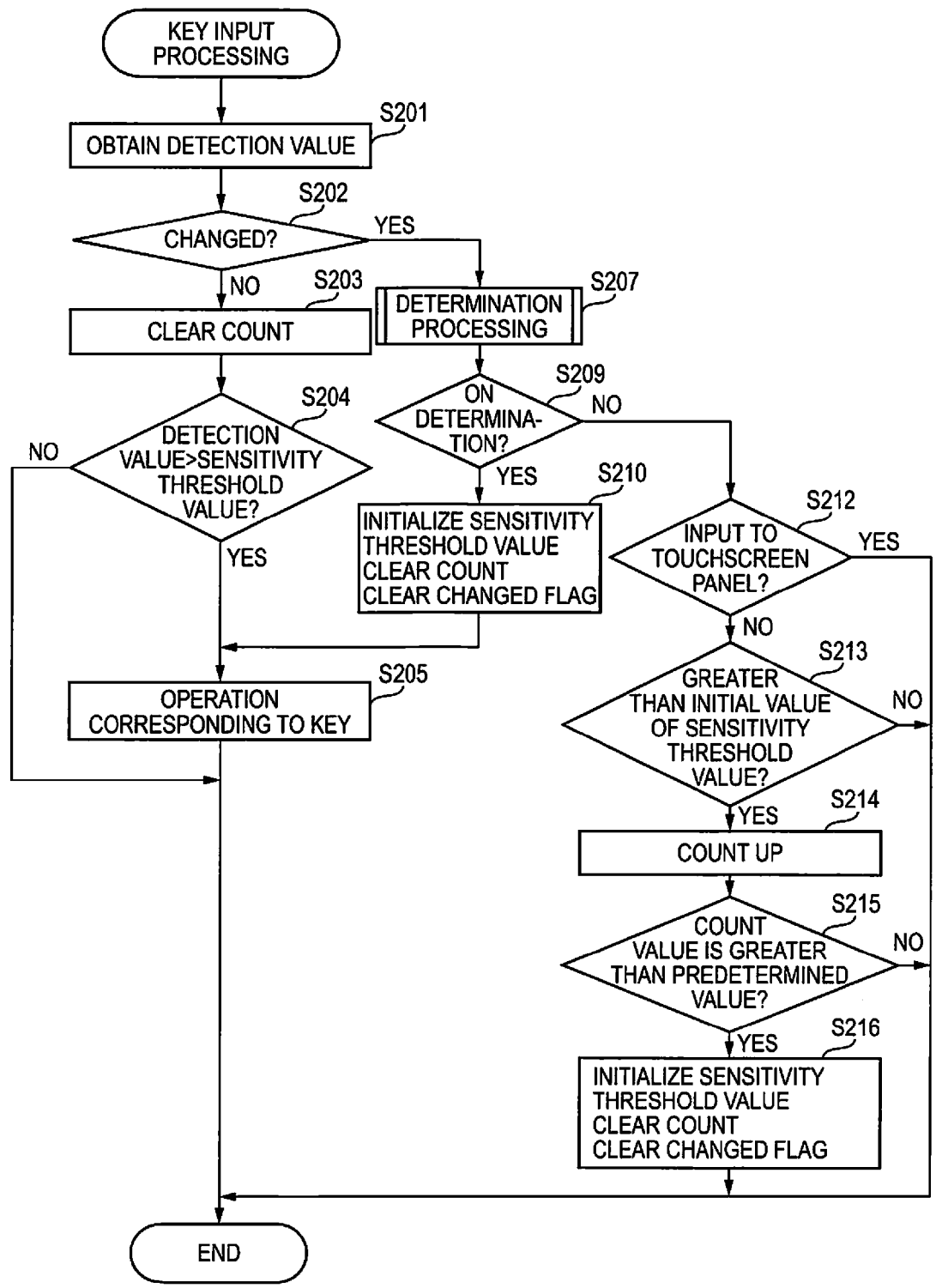
FIG. 7 is a flowchart depicting a sequence of key input processing.

Returning to the key input processing of FIG. 7, the CPU 31 determines whether a result of the determination is ON in the determination processing (S209). When it is determined that a result of the determination is ON (S209: YES), the CPU 31 initializes the sensitivity threshold value, and clears the count and the changed flag (S210). Also, the CPU 31 executes an operation corresponding to the input touch key 65 (S205), and ends the key input processing.

When the detection value as to the received input is greater than the sensitivity threshold value of which detection sensitivity has been lowered, for example, a possibility that the corresponding operation will be a user's intentional operation to the touch key area 42 is high. Also, when the intentional operation to the touch key area 42 is performed, a possibility that an input operation to the touch key area 42 will be continuously received is high. Therefore, when it is determined that the input operation for which the ON determination has been made is received, the CPU 31 validates the input through the input operation, executes a corresponding operation, and initializes the sensitivity threshold value to initialize the operability thereafter.

On the other hand, when it is determined that a result of the determination is OFF (S209: NO), the CPU 31 determines whether the input operation to the touchscreen panel 41 has been made within a predetermined time period (S212). That is, the CPU determines whether an output signal has been received from the touchscreen panel 41 from a predetermined time ago to a current time. The predetermined time is stored in the ROM 32 or the NVRAM 34.

When it is determined that there is an input to the touchscreen panel 41 (S212: YES), the CPU 31 ends the key input processing. Since the result of the determination processing in S207 is OFF, this output signal from the touch key area 42 is not high and there is a possibility that the corresponding operation is not a user's intentional input operation. When an input to the touchscreen panel 41 has been recently received, a possibility that the input received from the touch key area 42 is a false detection associated with the input operation to the touchscreen panel 41 is high. Therefore, when there is an input to the touchscreen panel 41 within the predetermined time, the CPU invalidates the input operation for which the OFF determination has been made, and ends the key input processing.

When it is determined that there is no input to the touchscreen panel 41 within the predetermined time (S212: NO), the CPU 31 determines whether the detection value is greater than the initial value of the sensitivity threshold value (S213). The initial value of the sensitivity threshold value is a sensitivity threshold value smaller than the changed sensitivity threshold value, and is an example of the third threshold value. In the meantime, the value, which is to be compared with the detection value in S213, is not limited to the initial value of the sensitivity threshold value and may be any value smaller than the changed sensitivity threshold value, such as a half value of the changed sensitivity threshold value, an intermediate value between the initial value of the sensitivity threshold value and the changed sensitivity threshold value, and the like.

When it is determined that the detection value is not greater than the initial value of the sensitivity threshold value (S213: NO), the CPU 31 ends the key input processing. When the detection value for which the OFF determination has been made is not greater than the initial value of the sensitivity threshold value, the corresponding input operation is not a valid input even though the detection sensitivity is not lowered. Therefore, when the detection value for which the OFF determination has been made is not greater than the initial value of the sensitivity threshold value, the CPU invalidates the input operation for which the OFF determination has been made, and ends the key input processing.

On the other hand, when the detection value is a detection value smaller than the sensitivity threshold value of which the detection sensitivity has been lowered but is determined greater than the initial value of the sensitivity threshold value (S213: YES), the CPU 31 counts up the count relating to the number of times of the input operation (S214). In the meantime, the CPU 31 may compare the touch key 65 for which the input operation has been previously received and the touch key 65 for which the input operation has been received this time, and may clear the count when the touch keys 65 are not the same.

Then, the CPU 31 determines whether the count is greater than a predetermined value (S215). When it is determined that the count is not greater than the predetermined value (S215: NO), the CPU 31 ends the key input processing. On the other hand, when it is determined that the count is greater than the predetermined value (S215: YES), the CPU 31 initializes the sensitivity threshold value, clears the count and the changed flag (S216), and ends the key input processing.

As the input operation having the detection value smaller than the changed sensitivity threshold value and greater than the initial value of the sensitivity threshold value, when the same input operation is repeatedly received more than a predetermined number of times, there is a possibility that the corresponding operation is a user's intentional input operation. Even though an input has a small detection value (but is larger than the sensitivity threshold value), when the input is received more than the predetermined number of times, the MFP 100 initializes the sensitivity threshold value. Therefore, the lowering of the operability of the input operation thereafter is suppressed. In the meantime, the predetermined number of times is an integer greater than 1, and is 2, for example. In the meantime, when the count value has not changed for predetermined time or longer, the CPU 31 may clear the count. That is, when more inputs than the predetermined number of times have been made within the predetermined time, the sensitivity threshold value may be initialized.

As described above, the MFP 100 of the first aspect has the operation panel 40 of which the touchscreen panel 41 and the touch key area 42 are provided adjacent to each other, and changes the sensitivity threshold value of the touch key area 42 when displaying the specific screen on the touchscreen panel 41. Specifically, when the display screen on the touchscreen panel 41 is a screen including an item that can be input to an area adjacent to the touch key area 42, the MFP increases the sensitivity threshold value of the touch key area 42. When an input to the touch key area 42 is received, if the detection value based on the output signal of the touch key 65 is greater than the changed sensitivity threshold value, the MFP validates the input to the touch key 65. That is, when displaying the specific screen on the touchscreen panel 41, the MFP 100 lowers the detection sensitivity of the touch key area 42. Thereby, it is possible to suppress the operator's unintentional input while suppressing the lowering of the operability, as compared to a configuration where the detection sensitivity is lowered without exception, irrespective of the display screen.

Subsequently, the MFP 100 of the second aspect is described. The MFP 100 of the second aspect where the detection sensitivity is changed in accordance with the specific input to the touchscreen panel 41 is different from the first aspect where the detection sensitivity is changed in accordance with the specific display screen. In the meantime, the processing that is to be executed when the input to the touch key 65 is received is the same as the first aspect, and the same processing as the key input processing of the first aspect is also executed in the MFP 100 of the second aspect.

In the below, a sequence of touch input processing of receiving an input to the touchscreen panel 41 in the MFP 100 of the second aspect is described with reference to a flowchart of FIG. 9. The touch input processing is executed by the CPU 31 when a valid input to the touchscreen panel 41 is received. The moment of the touch input processing is an example of the first input detection processing.

In the touch input processing, the CPU 31 first obtains a touch position that is a position in the touchscreen panel 41 at which the input has been received (S401). Then, the CPU 31 executes input change processing of changing the sensitivity threshold value in accordance with the touch position (S402).

Figure 10:
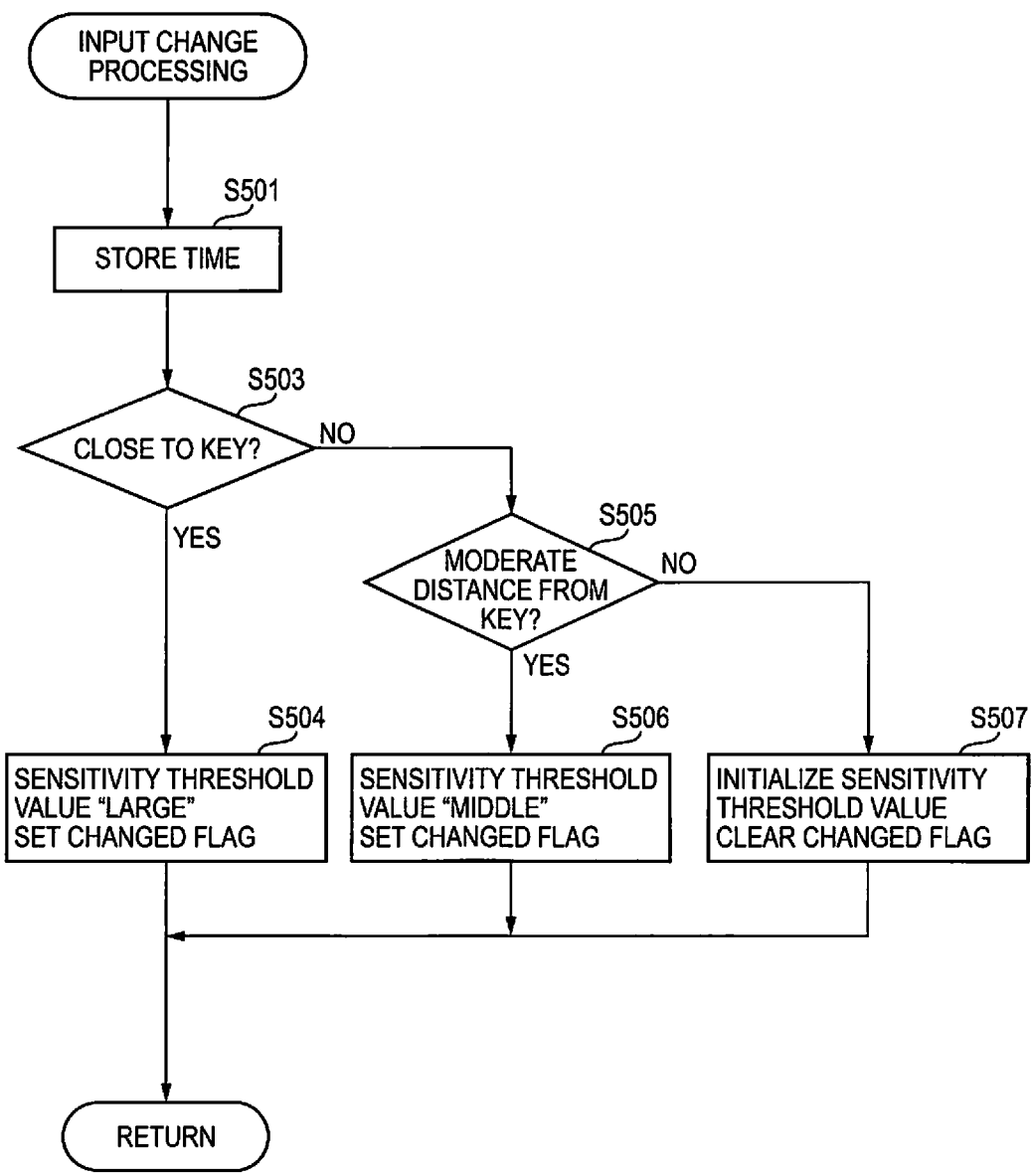
FIG. 10 is a flowchart depicting a sequence of input change processing.

Subsequently, a sequence of input change processing is described with reference to a flowchart of FIG. 10. In the input change processing, the CPU 31 first stores time at which the input has been received in the RAM 33 or the NVRAM 34 (S501). The corresponding time is used to determine whether the input to the touchscreen panel 41 has been received within the predetermined time in S212 of the key input processing. In the meantime, when the power supply becomes ON, too, the CPU 31 stores time in the RAM 33 or the NVRAM 34.

Then, the CPU 31 determines whether the touch position is within a predetermined range close to the touch key area 42 (S503). For example, when the touch position is within a quarter range from the right side of the touchscreen panel 41, the CPU 31 determines that the touch position is close to the touch key area 42. When it is determined that the touch position is close to the touch key area 42 (S503: YES), the CPU 31 sets the sensitivity threshold value to "large", sets a changed flag (S504), and ends the input change processing. The sensitivity threshold value "large" is a value of 1.5 to 2 times of the initial value, for example. The processing of S503 is an example of the position determination processing, and the processing of S504 is an example of the change processing.

When the touch position is close to the touch key area 42, there is a possibility that the user's finger or the like will unintentionally touch or approach the touch key area 42 due to the user's continuing operation. When the touch position is close to the touch key area 42, the MFP 100 of the second aspect increases the sensitivity threshold value to lower the detection sensitivity of the touch key area 42, so that the unintentional input is suppressed. The input to the predetermined range close to the touch key area 42 is an example of the specific input.

On the other hand, when it is determined that the touch position is not close to the touch key area 42 (S503: NO), the CPU 31 determines whether the touch position is within a predetermined range moderately distant from the touch key area 42 (S505). For example, when the touch position is within a half range from the right side of the touchscreen panel 41, even if not within a quarter range from the right side, i.e., within a range from a center to a quarter in the right direction, the CPU 31 determines that the touch position is moderately distant. When it is determined that the touch position is within the predetermined range moderately distant from the touch key area 42 (S505: YES), the CPU 31 sets the sensitivity threshold value to "middle", sets a changed flag (S506), and ends the input change processing. The sensitivity threshold value "middle" is a value greater than the initial value and smaller than the sensitivity threshold value "large."

When it is determined that the touch position is not within the predetermined range moderately distant from the touch key area 42 (S505: NO), the CPU 31 initializes the sensitivity threshold value, clears the changed flag (S507), and ends the input change processing. In the meantime, the initial value of the sensitivity threshold value, and the sensitivity threshold values "large" and "middle" are respectively stored in the ROM 32 or the NVRAM 34. The closer the touch position on the touchscreen panel 41 to the touch key area 42 is, the higher the possibility of the touch or approach is. Therefore, the closer the touch position to the touch key area 42 is, the CPU 31 lowers the detection sensitivity of the touch key area 42, so that the unintentional input is appropriately suppressed in accordance with a degree of the possibility of the unintentional input.

Figure 9:
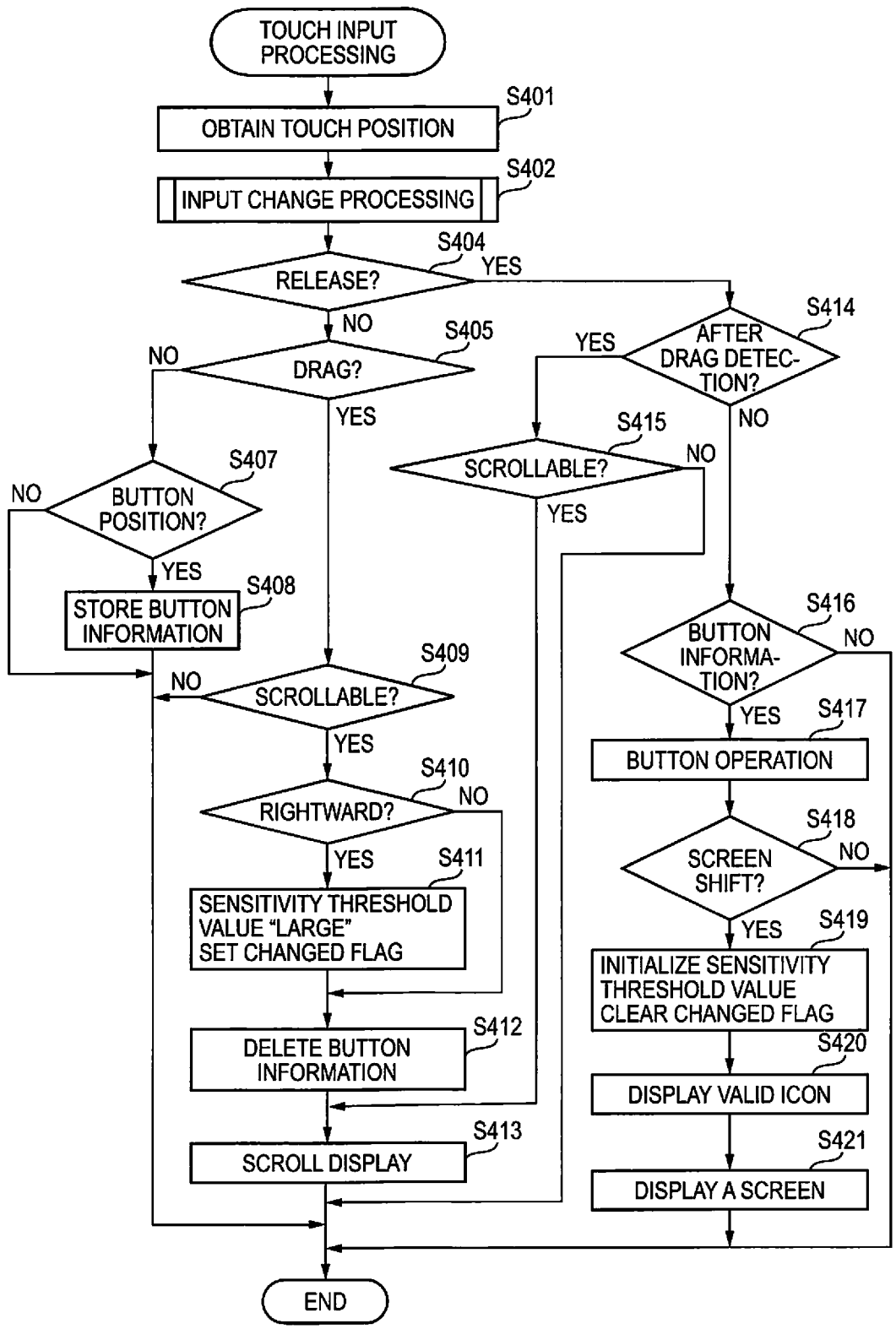
FIG. 9 is a flowchart depicting a sequence of touch input processing.

Returning to the touch input processing of FIG. 9, after the input change processing of S402, the CPU 31 determines whether a release has been detected (S404). When it is determined that a release has not been detected (S404: NO), the CPU 31 determines whether a drag operation has been detected (S405). That is, the CPU 31 determines whether the touch position has been moved from that of the previous processing. In the meantime, the CPU 31 repeatedly executes the touch input processing at an interval of 50 ms to 100 ms, for example.

When it is determined that a drag operation has not been detected (S405: NO), the CPU 31 determines whether the touch position is a button position within a detection area of an inputtable button (S407). When the touch position is the button position (S407: YES), the CPU 31 stores the information of the corresponding button in the RAM 33 or the NVRAM 34 (S408), and ends the touch input processing. In the meantime, when the touch at the corresponding position is first detected, the CPU 31 executes the determination of S407 and the processing of S408. When the touch position is not the button position (S407: NO), the CPU 31 ends the touch input processing.

When it is determined that a drag operation has been detected (S405: YES), the CPU 31 determines whether the drag operation is a drag within a scrollable area (S409). When it is determined that the drag operation is not within the scrollable area (S409: NO), the CPU 31 ends the touch input processing.

On the other hand, when it is determined that the drag operation is within the scrollable area (S409: YES), the CPU 31 determines whether a drag direction is a rightward direction (S410). The rightward drag direction has only to include a rightward component. For example, an oblique drag operation is also included. When it is determined that the drag direction is a rightward direction (S410: YES), the CPU 31 increases the sensitivity threshold value and sets a changed flag (S411). The processing of S410 is an example of the drag determination processing, and the processing of S411 is an example of the change processing. Meanwhile, in S411, the sensitivity threshold value is set to "large," for example.

When it is determined that the drag direction is not a rightward direction (S410: NO), or after the processing of S411, the CPU 31 deletes the button information (S412), if it is stored, scrolls the display of the touchscreen panel 41 in correspondence to an amount of the drag (S413), and ends the touch input processing. Meanwhile, in S412, the CPU 31 may not delete the button information if the position of the drag is within the detection area of the stored button information.

When the rightward drag operation is received, there is a possibility that the user's finger or the like will unintentionally touch or approach the touch key area 42 due to the inertia or the like. When the rightward drag operation is received, the MFP 100 of the second aspect increases the sensitivity threshold value to lower the detection sensitivity of the touch key area 42, even though the touch position is distant from the touch key area 42. Thereby, the unintentional input is suppressed. On the other hand, in case of a drag operation except for the rightward drag operation, a possibility that the user's finger or the like will unintentionally touch or approach the touch key area 42 is low. When a drag operation, not the rightward drag operation, is received, the MFP 100 of the second aspect does not increase the sensitivity threshold value. Therefore, the lowering of the operability is suppressed.

On the other hand, when it is determined that a release has been detected (S404: YES), the CPU 31 determines whether the release is a release after the drag has been detected (S414). When it is determined that the release is a release after the drag has been detected (S414: YES), the CPU 31 determines whether the drag is a drag within the scrollable area (S415). When it is determined that the drag is not a drag within the scrollable area (S415: NO), the CPU 31 ends the touch input processing.

When it is determined that the drag is a drag within the scrollable area (S415: YES), the CPU 31 scrolls the display of the touchscreen panel 41 in correspondence to an amount of the drag (S413), and ends the touch input processing. In the meantime, the display of the touchscreen panel is more preferably scrolled in correspondence to a speed of the drag immediately before the release, too.

When it is determined that the release is not a release after the drag has been detected (S414: NO), the CPU 31 determines whether the button information has been stored (S416). When it is determined that the button information has been stored (S416: YES), the CPU 31 executes an operation corresponding to the button information (S417). Meanwhile, in S417, the CPU 31 executes operations except for screen shift of the touchscreen panel 41. The screen shift means a display change of an entire screen, and does not include a partial change such as a window display for character input, for example.

Then, the CPU 31 determines whether or not to shift the display screen of the touchscreen panel 41 in accordance with the button information (S418). When it is determined that the button information has not been stored (S416: NO), or when it is determined that the screen shift is not to be performed (S418: NO), the CPU 31 ends the touch input processing.

When it is determined that the shift of the display screen of the touchscreen panel 41 is also to be performed (S418: YES), the CPU 31 initializes the sensitivity threshold value, and clears the changed flag (S419). Then, the CPU 31 turns on the LED of the icon of the touch key 65, which can be input on the display screen after the shift, of the respective touch keys 65 of the touch key area 42 (S420). Also, the CPU 31 displays the display screen after the shift on the touchscreen panel 41 (S421), and ends the touch input processing. When a screen is shifted, it is preferably to initialize the sensitivity threshold value for favorable operability. In the meantime, a screen may be automatically shifted in accordance with time-out of input standby after the release. Also in this case, the sensitivity threshold value is preferably initialized.

As described above, the MFP 100 of the second aspect has the operation panel 40 of which the touchscreen panel 41 and the touch key area 42 are provided adjacent to each other, and changes the sensitivity threshold value of the touch key area 42 when the specific input to the touchscreen panel 41 is received. Specifically, when the position of the received input operation is included in an area within the predetermined range close to the touch key area 42 or when the received input is a drag operation facing toward the touch key area 42, the MFP increases the sensitivity threshold value of the touch key area 42. Thereby, like the MFP 100 of the first aspect, it is possible to suppress the operator's unintentional input while suppressing the lowering of the operability.

The above illustrative embodiment is just exemplary and does not limit the disclosure. Therefore, the disclosure can be diversely improved and modified without departing from the gist thereof. For example, the disclosure can be applied to not only the MFP but also any apparatus having an input unit using a touchscreen panel, such as a copier, a printer, a scanner, a facsimile apparatus and the like.

Also, for example, both the functions of the MFP 100 of the first aspect and the functions of the MFP 100 of the second aspect may be provided. For example, when an input to the touchscreen panel 41 is received, the operations of the MFP 100 of the second aspect may be executed, and when changing the display screen of the touchscreen panel 41, the operations of the MFP 100 of the first aspect may be executed.

Also, in the illustrative embodiment, the touchscreen panel 41 is a resistance film type, and the touch key area 42 is an electrostatic capacitance type. However, the disclosure is not limited thereto. The touchscreen panel 41 may be an electrostatic capacitance type or any type such as an infrared or magnetic flux-based type, or the like. Also, the touch key area 42 may be a resistance film type or any type such as an infrared or magnetic flux-based type, or the like. Each touch key may be an input button displayed in the touch key area.

Also, in the illustrative embodiment, the sensitivity threshold value of the touch key area 42 has one value. However, the disclosure is not limited thereto. For example, the sensitivity threshold value may be provided for each touch key 65 of the touch key area 42, and when changing the sensitivity threshold value, the touch key 65 of which the sensitivity threshold value is to be changed may be selected. Alternatively, the touch keys 65 may be classified into a plurality of groups on the basis of functions and the like, and the sensitivity threshold value may be provided for each group.

Also, in the determination processing of the key input processing, it is determined whether the changed sensitivity threshold value is to be used, depending on the position of the touch key for which the input operation has been performed. However, the disclosure is not limited thereto. For example, the determination processing may be omitted. That is, the common sensitivity threshold value may be applied to the entire touch key area 42. Also in this case, the sensitivity threshold value is changed in accordance with the display of the specific screen or the reception of the specific input, so that it is possible to suppress the operator's unintentional input. In the meantime, the determination processing is preferably performed because the detection sensitivity of the touch key 65, which is little influenced by the touchscreen panel 41, or the touch key 65, which little influences the user's benefit, is not lowered, so that the operability is better that the configuration where the sensitivity is lowered with no exception.

Also, in the key input processing, even though an input has a small detection value, when the input is received more than once with respect to the same touch key 65, the sensitivity threshold value is initialized. However, the initialization may be omitted. For example, the processing of S213 to S215 of the key input processing may be omitted and the processing of S216 may be executed when a result of the determination in S212 is NO. Alternatively, the processing of S214 and S215 may be omitted and the processing of S216 may be executed when a result of the determination in S213 is YES.

Also, when any one of the touch position and the rightward drag operation is received, the MFP 100 of the second aspect changes the sensitivity threshold value. However, the sensitivity threshold value may be changed with respect to only one. For example, when the touch position is close to the touch key area 42, the sensitivity threshold value may be changed, and the sensitivity threshold value may not be changed with respect to the drag operation. For example, the determination processing of S410 and the processing of S411 in the touch input processing may be omitted, and the processing may proceed to S412 when a result of the determination in S409 is YES. Also, when the drag operation is a rightward drag operation, the sensitivity threshold value may be changed, and the sensitivity threshold value may not be changed with respect to the touch position. For example, the input change processing of S402 may be omitted.

Also, for example, when a drag operation is received, the sensitivity threshold value may be changed, irrespective of the drag direction. For example, the processing of S410 may be omitted, and the processing may proceed to S411 when a result of the determination in S409 is YES. Also, for example, when a rightward drag operation is received, even if it is not within the scrollable area, the sensitivity threshold value may be changed.

Also, in the illustrative embodiment, only the LED of the icon of the touch key, for which an input operation is received, of the touch keys 65 of the touch key area 42 is turned on. However, the LEDs of all icons may be turned on all the time. Alternatively, an icon of the touch key that can receive an input operation of the touch keys 65 of the touch key area 42 may have a first color and the other icons may have a second color. Alternatively, the icon may not be provided with the LED, and the icon may be simply printed at a position of each touch key of the operation panel 40. Also in this case, an input operation to a touch key that does not receive an input operation may be invalidated.

Also, the processing disclosed in the illustrative embodiment may be executed by the hardware such as a single CPU, a plurality of CPUs, an ASIC and the like, or a combination thereof. Also, the processing disclosed in the illustrative embodiment may be implemented as a variety of aspects such as a recording medium having a program for executing the processing recorded therein, a method and the like.

The input device disclosed in the specification includes the first input unit by the first detection method and the second input unit by the second detection method, which are adjacent to each other. The input device validates the input to the first input unit when the first detection value based on the output from the first input unit is greater than the first threshold value, and validates the input to the second input unit when the second detection value based on the output from the second input unit is greater than the second threshold value. Moreover, the input device is configured to change the second threshold value so that the detection sensitivity of the second input unit is lowered, in accordance with at least one of the display of the specific screen on the first input unit and the reception of the specific input to the first input unit. The specific screen is a screen including an item that can be input to an area adjacent to the second input unit, and the specific input is an input that can be an input to an area adjacent to the second input unit.

That is, according to the input device disclosed in the specification, when the specific screen is displayed by the first input unit, an input operation to the area adjacent to the second input unit is received. Therefore, a possibility that the second input unit will be also touched or approached during the input operation increases. Also, when an input that can be an input to an area adjacent to the second input unit is received, as the input to the first input unit, a possibility that the second input unit will be also touched or approached by an input operation thereafter increases. For this reason, in this case, the detection sensitivity of the second input unit is lowered, so that it is possible to suppress an operator's unintentional input to the second input unit. In the meantime, the input device is configured not to lower the detection sensitivity of the second input unit, except for the display of the specific screen and the reception of the specific input. For this reason, as compared to a configuration where the detection sensitivity of the second input unit is lowered without exception, it is possible to suppress the operability of the second input unit from being lowered.

What is claimed is:

1. An input device comprising:
   a first input interface configured to display a screen for receiving an input and to output a first output value in accordance with an input resulting from touch or approach of an object to the first input interface;
   a second input interface disposed adjacent to the first input interface, the second input interface being configured to output a second output value in accordance with an input resulting from touch or approach of the object to the second input interface; and
   a controller configured to:
      in response to detecting an input to the first input interface,
         determine whether a first detection value based on the first output value is greater than a first threshold value, and
         validate the input to the first input interface, when it is determined that the first detection value is greater than the first threshold value;
      in response to detecting an input to the second input interface,
         determine whether a second detection value based on the second output value is greater than a second threshold value, and
         validate the input to the second input interface, when it is determined that the second detection value is greater than the second threshold value; and
      change the second threshold value so that detection sensitivity is lowered in response to at least one of:
         a specific screen being displayed as a screen to be displayed on the first input interface, the specific screen comprising an item located at an area adjacent to the second input interface; and
         an input received at the first input interface being a specific input to an area adjacent to the second input interface.

2. The input device according to claim 1,
   wherein the second input interface is adjacent to the first input interface in a first direction, and
   wherein the specific screen is a screen comprising an input item for receiving an input resulting from a drag operation in the first direction.

3. The input device according to claim 2, wherein the specific screen is a screen comprising an input item for receiving an input resulting from a drag operation toward the second input interface in the first direction.

4. The input device according to claim 1, wherein the specific screen is a screen comprising an input item for receiving an input in an area of which a distance from the second input interface is within a predetermined range.

5. The input device according to claim 1,
   wherein the second input interface is disposed adjacent to the first input interface in the first direction, and
   wherein the specific screen is a screen comprising an input item for receiving an input resulting from a drag operation in a second direction in an area of which a distance from the second input interface is within a predetermined range, the second direction intersecting with the first direction.

6. The input device according to claim 1,
   wherein the controller is configured to, in response to detecting the input to the first input interface, determine whether a detection position of the input is included in a predetermined area, an area of which a distance from the second input interface is within a predetermined range, and
   wherein the specific input is an input to the first input interface for which it is determined that the detection position of the input is included in the predetermined area.

7. The input device according to claim 1,
   wherein the second input interface is disposed adjacent to the first input interface in a first direction,
   wherein the controller is configured to, in response to detecting the input to the first input interface, determine whether the input to the first input interface comprises a drag operation toward the second input interface in the first direction, and
   wherein the specific input is the input to the first input interface for which it is determined that the input comprises the drag operation toward the second input interface in the first direction.

8. The input device according to claim 6, wherein in the changing the second threshold value, the controller is configured to change the second threshold value such that the detection sensitivity is lowered, as the detection position of the input to the first input interface is closer to the second input interface.

9. The input device according to claim 7, wherein in the changing the second threshold value, the controller is configured to change the second threshold value such that the detection sensitivity is lowered, as the detection position of the input to the first input interface is closer to the second input interface.

10. The input device according to claim 6, wherein the controller is configured to, after changing the second threshold value, return the second threshold value to an initial value when a screen displayed on the first input interface is shifted to another screen.

11. The input device according to claim 7, wherein the controller is configured to, after changing the second threshold value, return the second threshold value to an initial value when a screen displayed on the first input interface is shifted to another screen.

12. The input device according to claim 1, wherein the controller is configured to, after changing the second threshold value, return the second threshold value to an initial value when the input to the second input interface is validated on the basis of the changed second threshold value.

13. The input device according to claim 1, wherein the controller is configured to, after changing the second threshold value, return the second threshold value to an initial value when a specific input to the second input interface is continuously performed more than a predetermined number of times within a predetermined time period, the second detection value corresponding to the specific input being smaller than the changed second threshold value and being greater than a third threshold value, the third threshold value being smaller than the changed second threshold value.

14. The input device according to claim 1,
   wherein the second input interface comprises a predetermined input location at which an input is to be received with the second input interface, the predetermined input location comprising:
   a first input location; and
   a second input location that is more distant from the first input interface than the first input location, and
   wherein after changing the second threshold value, the controller is configured to:

when the second output value is based on an input to the first input location, validate the input to the second input interface, when it is determined that the second detection value is greater than the changed second threshold value; and when the second output value is based on an input to the second input location, validate the input to the second input interface, when it is determined that the second detection value is greater than an initial value of the second threshold value.

15. The input device according to claim 1,
wherein the second input interface comprises a predetermined input location at which an input is to be received with the second input interface, the predetermined input location comprising:
  a first input location for receiving an input of a first instruction, the first instruction being a shift instruction involving shift of a screen to be displayed on the first input interface; and
  a second input location for receiving an input of a second instruction, the second instruction being a non-shift instruction not involving shift of a screen to be displayed on the first input interface, and
wherein after changing the second threshold value, the controller is configured to:
  when the second output value is based on an input to the first input location, validate the input to the second input interface, when it is determined that the second detection value is greater than the changed second threshold value; and
  when the second output value is based on an input to the second input location, validate the input to the second input interface, when it is determined that the second detection value is greater than an initial value of the second threshold value.

16. The input device according to claim 1, wherein one of the first input interface and the second input interface is a capacitive sensing type interface.

17. The input device according to claim 1, wherein one of the first input interface and the second input interface is a resistive sensing type interface.

18. The input device according to claim 1,
wherein the first input interface comprises a touchscreen panel, the touchscreen panel comprising a touch input device and a display screen, and
wherein the second input interface comprises a touch key panel.

19. A control method of an input device, the input device comprising a first input interface configured to display a screen for receiving an input and to output a first output value in accordance with an input resulting from touch or approach of an object to the first input interface, and a second input interface disposed adjacent to the first input interface and configured to output a second output value in accordance with an input resulting from touch or approach of the object to the second input interface, the control method comprising:
  in response to detecting an input to the first input interface,
    determining whether a first detection value based on the first output value is greater than a first threshold value, and
    validating the input to the first input interface, when it is determined that the first detection value is greater than the first threshold value;
  in response to detecting an input to the second input interface,
    determining whether a second detection value based on the second output value is greater than a second threshold value, and
    validating the input to the second input interface, when it is determined that the second detection value is greater than the second threshold value; and
  changing the second threshold value so that detection sensitivity is lowered, in response to at least one of:
    a specific screen being is displayed as a screen to be displayed on the first input interface, the specific screen comprising an item located at an area adjacent to the second input interface: and
    an input received at the first input interface being a specific input to an area adjacent to the second input interface.

20. A non-transitory computer-readable medium having a computer program stored thereon and readable by a computer of an input device, the input device comprising a first input interface configured to display a screen for receiving an input and to output a first output value in accordance with an input resulting from touch or approach of an object to the first input interface, and a second input interface disposed adjacent to the first input interface and configured to output a second output value in accordance with an input resulting from touch or approach of the object to the second input interface, the computer program, when executed by the computer, causes the input device to perform operations comprising:
  in response to detecting an input the first input interface,
    determining whether a first detection value based on the first output value is greater than a first threshold value, and
    validating the input to the first input interface, when it is determined that the first detection value is greater than the first threshold value;
  in response to detecting an input to the second input interface,
    determining whether a second detection value based on the second output value is greater than a second threshold value, and
    validating the input to the second input interface, when it is determined that the second detection value is greater than the second threshold value; and
  changing the second threshold value so that detection sensitivity is lowered in response to at least one of:
    a specific screen being displayed as a screen to be displayed on the first input interface, the specific screen comprising an item located at an area adjacent to the second input interface; and
    an input received at the first input interface being a specific input to an area adjacent to the second input interface.

* * * * *

UNITED STATES PATENT AND TRADEMARK OFFICE
CERTIFICATE OF CORRECTION

PATENT NO. : 9,886,137 B2
APPLICATION NO. : 15/226116
DATED : February 6, 2018
INVENTOR(S) : Yutaka Urakawa Page 1 of 1

It is certified that error appears in the above-identified patent and that said Letters Patent is hereby corrected as shown below:

On the Title Page

(72) Inventor should read:
Yutaka Urakawa, Nagoya (JP)

Signed and Sealed this
Eighteenth Day of December, 2018

Andrei Iancu
*Director of the United States Patent and Trademark Office*